US006078678A

United States Patent [19]

Gavrilos

[11] Patent Number: 6,078,678

[45] **Date of Patent: *Jun. 20, 2000**

[54] METHOD AND APPARATUS FOR OBJECT SURVEILLANCE ALONG A TRANSPORT PATH

[75] Inventor: Emanuel N. Gavrilos, Melrose Park, Ill.

[73] Assignee: Bell & Howell Mail and Messaging Technologies Co., Durham, N.C.

[ * ] Notice: This patent is subject to a terminal disclaimer.

[21] Appl. No.: 09/311,747

[22] Filed: May 14, 1999

Related U.S. Application Data

[63] Continuation of application No. 08/062,033, May 17, 1993, Pat. No. 5,912,979, which is a continuation of application No. 07/608,641, Nov. 2, 1990, abandoned.

[51] Int. Cl.[7] .................................................... G06K 9/00

[52] U.S. Cl. .................................................... 382/101

[58] Field of Search .................................... 382/101, 103, 382/135, 199; 209/579, 900, 934; 348/94, 107, 143; 701/300; 364/478.13, 478.17; 700/225, 229

[56] References Cited

U.S. PATENT DOCUMENTS

| | | | |
|---|---|---|---|
| 3,819,173 | 6/1974 | Anderson et al. | 270/54 |
| 4,247,008 | 1/1981 | Dobbs | 209/569 |
| 4,257,324 | 3/1981 | Stefansson et al. | 101/93.01 |
| 4,328,962 | 5/1982 | Akers | 271/12 |
| 4,338,671 | 7/1982 | Korytkowski et al. | 364/478 |
| 4,364,554 | 12/1982 | Akers | 271/272 |
| 4,432,458 | 2/1984 | Daboub | 209/564 |
| 4,497,040 | 1/1985 | Gomes et al. | 364/900 |
| 4,503,976 | 3/1985 | Cloud et al. | 209/546 |
| 4,570,916 | 2/1986 | Thompson | 270/52.5 |
| 4,835,403 | 5/1989 | Wisniewski | 250/561 |
| 4,965,829 | 10/1990 | Lemelson | 382/1 |
| 5,105,363 | 4/1992 | Dragon et al. | 364/469 |

FOREIGN PATENT DOCUMENTS

| | | | |
|---|---|---|---|
| 0 102 704 | 3/1984 | European Pat. Off. | B43M 3/04 |

OTHER PUBLICATIONS

Raes et al., "Optical Document Sorter ODS–1," Electrical Communications, vol. 45, No. 2, 1970, pp. 135–143, 1970.

"Mail Processing System: Sorting Model 1000, 800, 600 Encoding Model 400," Bell & Howell brochure, 1988, Bell & Howell Company, Form No. PH–547, 12 pages. 1988.

*Primary Examiner*—Andrew W. Johns

*Attorney, Agent, or Firm*—Millen, White, Zelano, Branigan, P.C.

[57] ABSTRACT

A method and apparatus for document surveillance along a transport path in a mail sorting machine includes using a plurality of sequentially positioned photocells affixed along the transport path to detect document separation and jamming events through the application of assigned document identification and message transfer schemes whereby one sensor detects an edge of the document and transfers the document identifier and a shaft encoder count to the next sensor along the transport path in the form of a message. A message queue for each sensor is maintained to detect improper document leading edge and trailing edge conditions. A series of surveillance modules operates on a multitasking basis through a primary master processor.

2 Claims, 13 Drawing Sheets

METHOD AND APPARATUS FOR OBJECT SURVEILLANCE ALONG A TRANSPORT PATH

This a continuation of application Ser. No. 08/062,033 filed May 17, 1993 now U.S. Pat. No. 5,912,979; which is a continuation of Ser. No. 07/608,641, filed Nov. 2, 1990, now abandoned.

FIELD OF INVENTION

This invention generally pertains to apparatus and methods for sorting objects and more particularly to computerized apparatus and methods for high speed document surveillance and sorting with multi-task tracking of documents.

BACKGROUND OF THE INVENTION

Mail sorting machines provide postal patrons that handle high volumes of mail with the ability to take advantage of the United States Postal Service's reduced postal rates. The United States Postal Service defines its postal class structure in a manner that generally provides lower rates based upon certain criteria such as the length (five digits versus nine digits) and manner (bar-coded or not) by which the zip code information is provided, and also the number of mail pieces that are included in a given package (a certain number of mail pieces, such as ten or more). Thus, a postal patron can achieve a considerable postage savings for bulk mailing by qualifying for less expensive pre-sorted and bar-coded rates. Sorting machines may also be used to sort incoming mail that has already been processed by the United States Postal Service.

Such automated mail sorting machines include Bell & Howell Company models J1000, J800 and J600 Mail Processing Systems and are provided by the Phillipsburg Division of Bell & Howell Company. These automated sorting machines write or optically read characters, and/or bar code labels and sort mail into various bins based upon detected ZIP code information.

Typically a mail sorting machine receives multiple mail pieces in an input hopper whereafter the mail pieces are transported to an extraction device which orientates each mail piece and feeds it to the transport path. Such a system is described in U.S. Patent Application of Paul F. Kostyniuk, assigned to instant assignee, entitled "Mail Sorting Apparatus and Method," filed Oct. 16, 1990, and is hereby incorporated by reference. The transport path generally provides for single file flow of the documents past the various stations of the sorting machine. Once a mail piece enters the transport path, a character reader reads the address and/or ZIP code written on the mail piece. A computer determines whether the ZIP code is a valid ZIP code and communicates the ZIP code digits to a bar code label printer. The label printer prints the bar-code label at the proper location on the mail piece. As the mail piece proceeds along the transport path, a bar code reader verifies whether a legitimate ZIP code label is printed and whether that ZIP code is attached to the proper mail piece.

In mail sorting systems such as these, accurate surveillance and alignment of documents is critical. Various problems arise along the transport path when an inadequate document tracking system is in place. These problems, which are aggravated as the speed of the system is increased, include document jamming, delayed document separation, and document "disappearance."

Document jamming occurs when a document gets caught along the transport path. One type of document jamming is called document shingling. Document shingling occurs when two or more documents appear to be a single document to the system such as when two documents are too close together or are stuck together. Delayed document separation occurs when two documents that have been fed together, separate later along the transport path. Document "disappearance" occurs when a document exits the sorting system prematurely or gets "trapped" in a section of the transport path where it cannot be detected.

Current sorting systems label mail pieces based upon a mail piece's assumed position in a queue. This type of sorting system detects when a first document enters the transport path and assumes that the first document to enter is the first document to leave the transport path. Such a system typically mislabels and missorts documents when a document inadvertently leaves the transport path. An example of this occurs when a document has been detected as properly entering the transport path and has its ZIP code properly read by the optical character reader. When this document is extracted by an operator or otherwise removed from (e.g., flies off or drops off of the transport path) the transport path before reaching the bar code printer, the system automatically marks the next document with the ZIP code information designated for the missing document assuming that the next document in line was the proper document. No real time automatic document surveillance system exists to prevent this type of error.

Known systems also fail not only to detect many of these problems, but they also fail to adequately correct many of these problems. For example, current systems that are able to detect a shingling event, flush the entire sorting system instead of minimizing its effects. This results in additional resorting of properly sorted documents. The shingling event is typically detected by shingling sensors at the beginning and end of the transport path.

Other systems fail to differentiate one type of error from another. An example is a document "disappearance" event wherein the system considers this event as a shingling event. System errors are not properly identified thereby limiting the ability to provide corrective measures. Thus, it is desirable to properly detect and correct disappearance errors and other errors without requiring a flushing of the transport path or other area of the sorting system.

There exists a need for a high speed intelligent automatic document sorting system that effectuates accurate (real time) document surveillance and provides error correction techniques to overcome the above mentioned problems. Such a system preferably should not require flushing the entire sorting system for all detected errors, but should correct errors to improve document throughput. The system should also accommodate fast transport path speeds without substantially increasing undetected sorting errors.

SUMMARY OF INVENTION

These needs and others are substantially met through the method and apparatus for intelligent document sorting disclosed herein. The invention comprises a real time multitasking surveillance module including a plurality of edge detecting sensors wherein a document is continuously tracked along a transport path by assigning a unique document identifier to each document and employing a unique message transferring scheme between consecutive sensors in the module. The message transferring scheme includes transferring the document identifier in the message to the next sensor. These messages also include shaft tick counts retrieved from the transport path belt shaft encoder. The counts are recorded at the leading and trailing edges of the document and sent to the message queue for the next consecutive sensor.

An expected net leading edge arrival count is compared to the actual net arrival shaft tick count for the same document as identified by the unique document identifier. If the actual arrival time (i.e., in shaft encoder ticks) exceeds the expected arrival time, the module detects a document disappearance and the message queue for the sensor is adjusted; if the actual arrival time is less than the expected arrival time, a document separation is detected and a new document identifier is assigned to the document for continued tracking capability. The message queue is adjusted to maintain the proper message associated with the next document.

Multiple surveillance modules are utilized as components of a larger complete surveillance system. Each module has a master processor that operates independently of any other module processor. Each sensor in a module is handled as a separate task by the module's processor. Each sensor is used to detect document separations, document disappearances and document jams. Multiple surveillance modules are monitored by a primary master processor that interfaces with the data processing unit of the sorting system through a Multibus backplane.

BRIEF DESCRIPTION OF THE DRAWINGS

The features of the present invention which are believed to be novel are set forth below with particularity in the appended claims. The invention, together with further objects and advantages thereof, may be understood by reference to the following description taken in conjunction with the accompanying drawings.

DETAILED DESCRIPTION OF THE INVENTION

Figure 1:
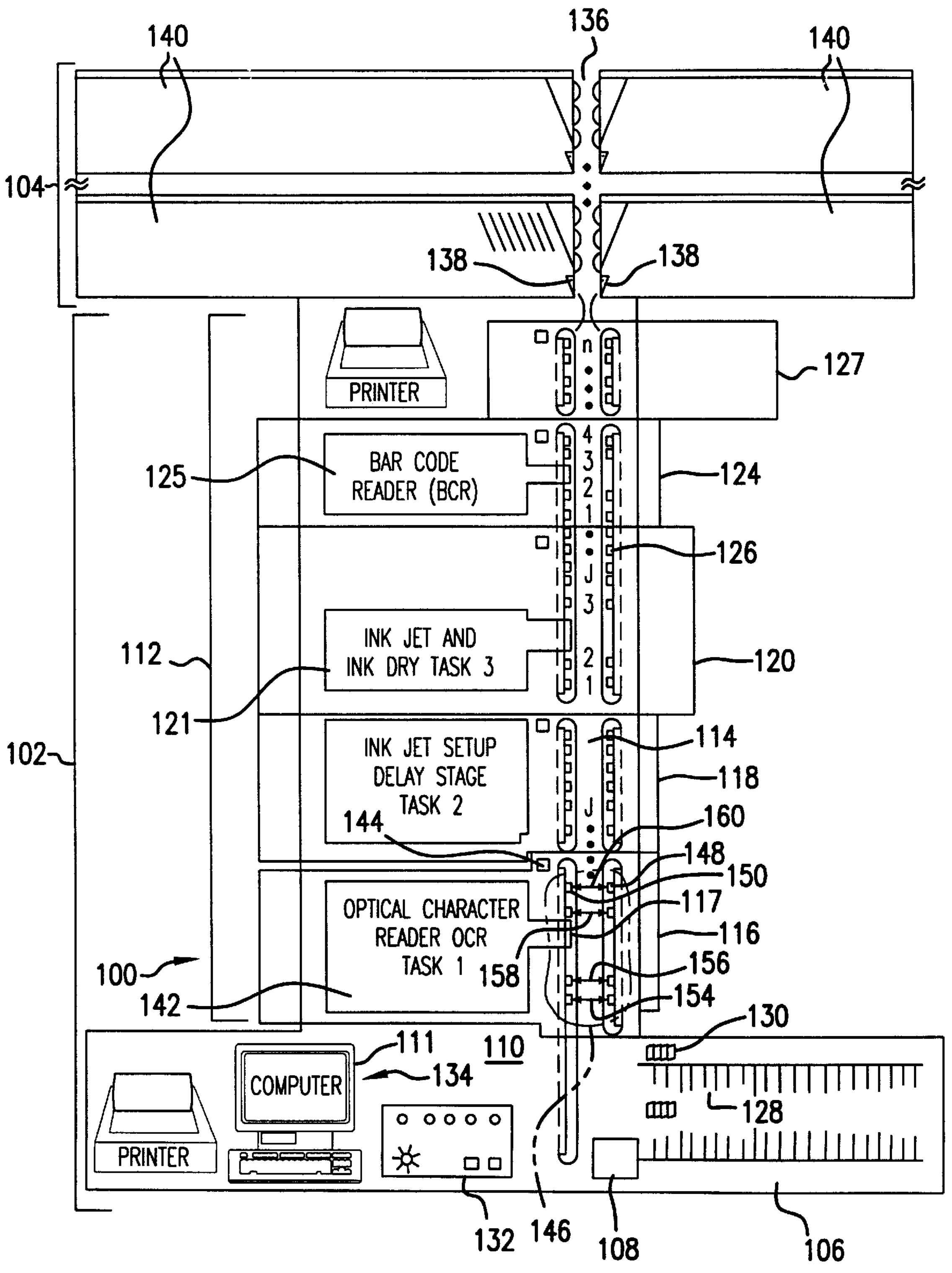
FIG. 1 is a diagrammatic top view of an intelligent sorting apparatus in accordance with the invention.

FIG. 1 generally depicts an intelligent document sorting system 100 according to the invention. The intelligent document sorting system 100 includes a document processing system 102 and a bin sorting stage 104 into which documents are ultimately sorted.

The document processing system 102 includes an input hopper 106; a document picker 108; a central processing computer 110; and a transport path 114 such as are known in the art, along which documents travel on edge toward the bin sorting stage 104. Along the transport path are various processing stations also included in a multi-tasking document surveillance system 112, including an optical character recognition (OCR) station 116; a secondary delay station 118; an Ink Jet printer station 120; a bar-code reader station 124; a conveyor/sorting station 127; and multiple sensors 126 associated with each station.

A plurality of hopper floor belts 128 and hopper augurs 130 (not shown) transport documents on edge toward the document picker 108. The documents are oriented with the name and address pressed against the picker 108. The picker (a vacuum type) 108 assures proper edge orientation and places the document onto the transport path 114. The documents travel as high speed (e.g., 165 in./sec. in the illustrated embodiment) on edge down the transport path with their name and address information facing the OCR window 117 and continue past the OCR station 116, the delay station 118, the Ink Jet printer station 120 including an INK DRY station, and the BCR station 124.

The document processing system also includes an operator console 132 and data processing system 134. The data processing system includes a control processing unit 111, such as an IBM personal computer or the like, and an interface system for interfacing with the document surveillance system 112.

The bin sorting stage 104 comprises sorting apparatus which is well known in the art including a central transport assembly 136 which directs documents along a sorting path that is collinear with the transport path 114 of the document processing system 102. A document is deflected into the proper bin 140 by diverter gates 138 based upon its coded ZIP code. The sorting bin stage 104 includes a plurality of unillustrated transport belts and may include any number of bins depending upon the given application. The sorting bin stage 104 is coupled to the document surveillance system 112.

The document surveillance system 112 operates as a real time multi-tasking fault detection, error correction system. The first task involves the OCR station 116. Each non-secondary station (OCR INK JET, and BCR stations) is similar in that it includes a primary function such as reading ZIP codes, printing bar codes, or reading bar code labels, and in that each is an intelligent document surveillance module. The plurality of intelligent document surveillance modules are also integrated by a primary master processor into one larger intelligent document sorting system. For example, one intelligent surveillance module, the OCR station, includes an OCR 142, a shaft encoder 144, and a plurality of sensors 146 wherein each sensor is handled as a separate task by the surveillance module. These components are operably coupled to the OCR secondary master processor not shown in FIG. 1 (shown in FIG. 2).

The OCR 142 may be of the type MRS 40 manufactured and marketed by the Postal Logic Division of Bell & Howell in Dallas, Tex. The shaft encoder 144 is a conventional incremental encoder that produces a given number of shaft ticks (digital pulses) for a predetermined unit of instantaneous angular position of an encoder disc. The encoder disc is coupled to the rotating shaft of the transport path belt drive. Incremental encoders of this type generally require a counting system which counts the pulses generated by the encoder. The counts are added or subtracted from a given reference point. Although the preferred embodiment utilizes a belt driven system as the transport path, any other suitable transport mechanism may be used.

Such encoders provide an accurate shaft position used to measure the distance traveled by a given document along a section of the transport path. This accurate document positioning mechanism allows the OCR and other stations to accurately read and later print bar coded ZIP code information onto the document. The multiple station system uses a separate belt set for each station. Consequently, multiple shaft encoders are used to provide accurate distance information for each station. The digital shaft encoder 144 may, for example, be of the type sold by BEI Motion Systems Company, Model-M15, or Sumtak Electronic Instruments, Model-LEC, or any other suitable shaft encoder. The shaft encoder 144 and the plurality of sensors 146 provide inputs for the secondary master processor dedicated to the corresponding surveillance module.

The plurality of sensors 146 are of the optical sensor type and include an optical energy emitter 148 and an optical energy detector 150. There are at least four sensors within the OCR station 116. These include a first document detection sensor 154; a second document detection sensor 156; a third document detection sensor 158; and a fourth detection sensor 160. These sensors may, for example, be of the type manufactured by Honeywell, Inc., Microswitch Division, in Richardson, Tex., Model Number SE 5455-3 for an emitter and model number SD 5443-3 for the photodetectors. As appreciated by those of ordinary skill in the art, other suitable sensors other than the optical type may be used, for example, weight detection sensors, or sensors operating at non-optical frequencies within the electromagnetic frequency spectrum. The spacing of sensors may vary along the transport path and may be adjusted depending upon the given application. The system operator may modify stored sensor spacing data to accommodate changes in sensor spacing. For example, the sensors 154, 156, 158 and 160 in the OCR station 116 vary in spacing from four inches to twelve inches.

Figure 2:
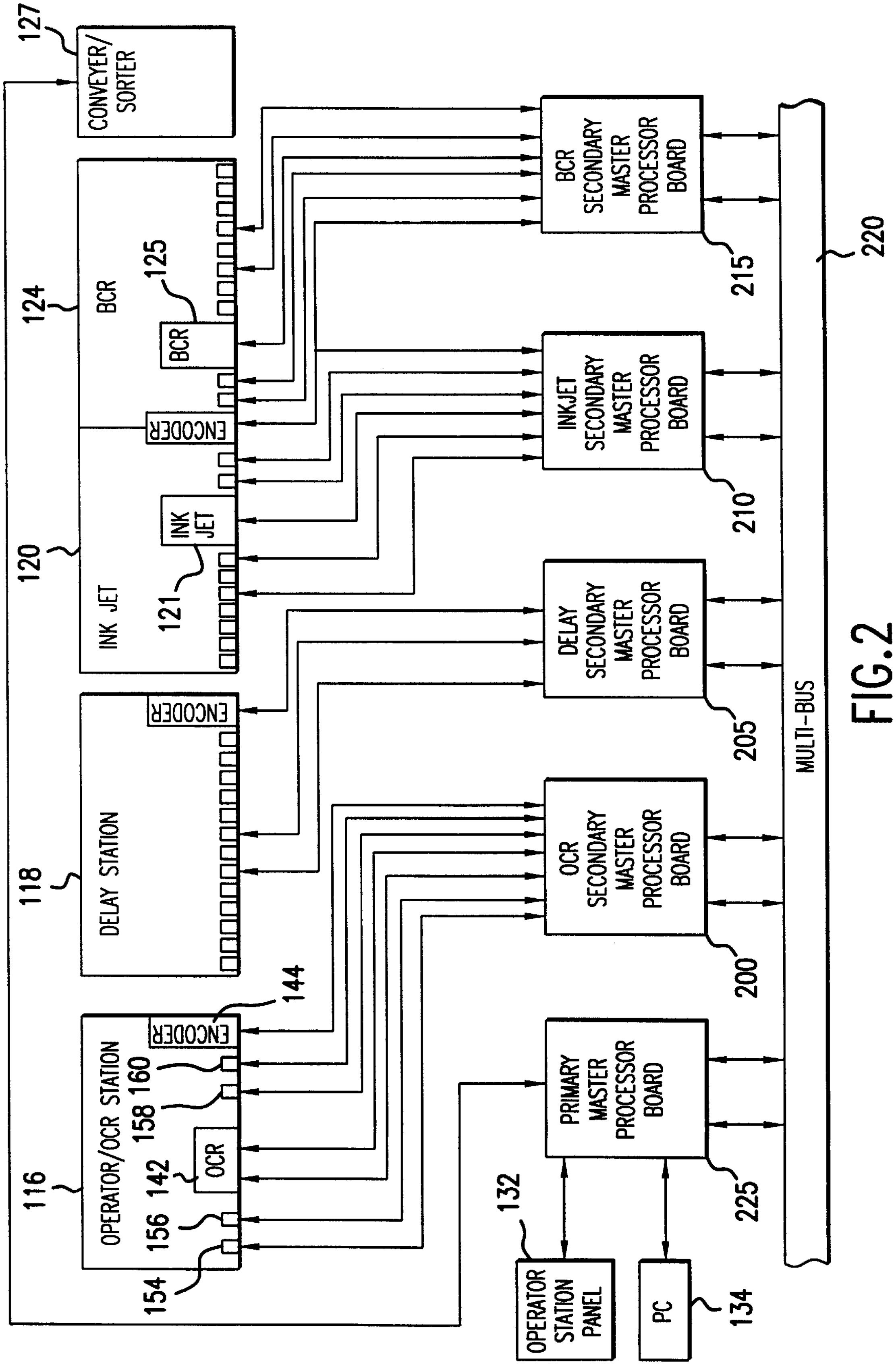
FIG. 2 is a detailed functional block diagram of the intelligent sorting apparatus in accordance with the invention.

FIG. 2 is a detailed block diagram of the system 102 which generally depicts interconnections to facilitate the real time multi-tasking functions between the various modules within the document processing system 102. The multi-tasking system includes an OCR secondary master processor board 200 coupled to the OCR station 116, a delay station secondary master processor board 205 operably coupled to the document delay station 118, an INK JET secondary master processor board 210 to the INK JET station 120, and a BCR secondary master processor board 215 operably coupled to the BCR station 124. Each of the processor boards 200, 205, 210, 215 includes a secondary master microprocessor and shares a common bi-directional MULTIBUS 220 (e.g., in the illustrated embodiment, the industry standard INTEL MULTIBUS) with a primary master processor board 225. These secondary master processors generally communicate on a multi-bus parallel priority basis with a primary master processor on board the primary master board 225. The primary master processor does not assign tasks to the secondary master processors. The secondary master processors continuously perform their particular tasks independent from the tasks performed by the primary master processor. The primary master processor board 225 is also coupled with the data processing system 134, the operator console 132, and the conveyor sorter station 127. In the illustrated embodiment, each of the processor boards 225, 200, 205, 210, 215 may be, for example, a Model M68K10-5 processor board marketed by SBE, Inc., located in Concord, Calif. These boards employ a Motorola series 68000 microprocessor, and each includes two standard serial and two standard parallel ports and utilize the industry standard MULTIBUS. In the illustrated embodiment, the primary master processor board 225 includes a piggy-backed I/O board which provides three extra conventional parallel ports, and each of the secondary master processor boards 200, 205, 210, 215 includes two piggy-backed I/O boards providing six extra parallel ports. These I/O ports are used to couple to optical sensors, and other devices as shown in FIG. 2. The primary master processor board 225 is coupled via the parallel ports to the personal computer 134, the operator panel 132 and the sorter 127 and communicates with these devices in a manner substantial as described in the incorporated co-pending patent application to P. F. Kostyniuk.

Each secondary master processing board 200, 205, 210, 215 performs real time document detection surveillance based upon received inputs from its corresponding sensors and shaft encoder. A microprocessor on each processor board performs the processing on this input data.

The primary master processor board 225, utilizing its on board microprocessor, supports the multi-tasking environment. Generally, this multi-tasking processing controls documents that are leaving one intelligent surveillance module and entering another. Each processing station, being monitored by its associated secondary master processing board, is controlled by a separate task of the master processing board 225. The master processor board 225 communicates with the data processing system 134 to assign the proper ZIP code number to the proper document.

Figure 3A:
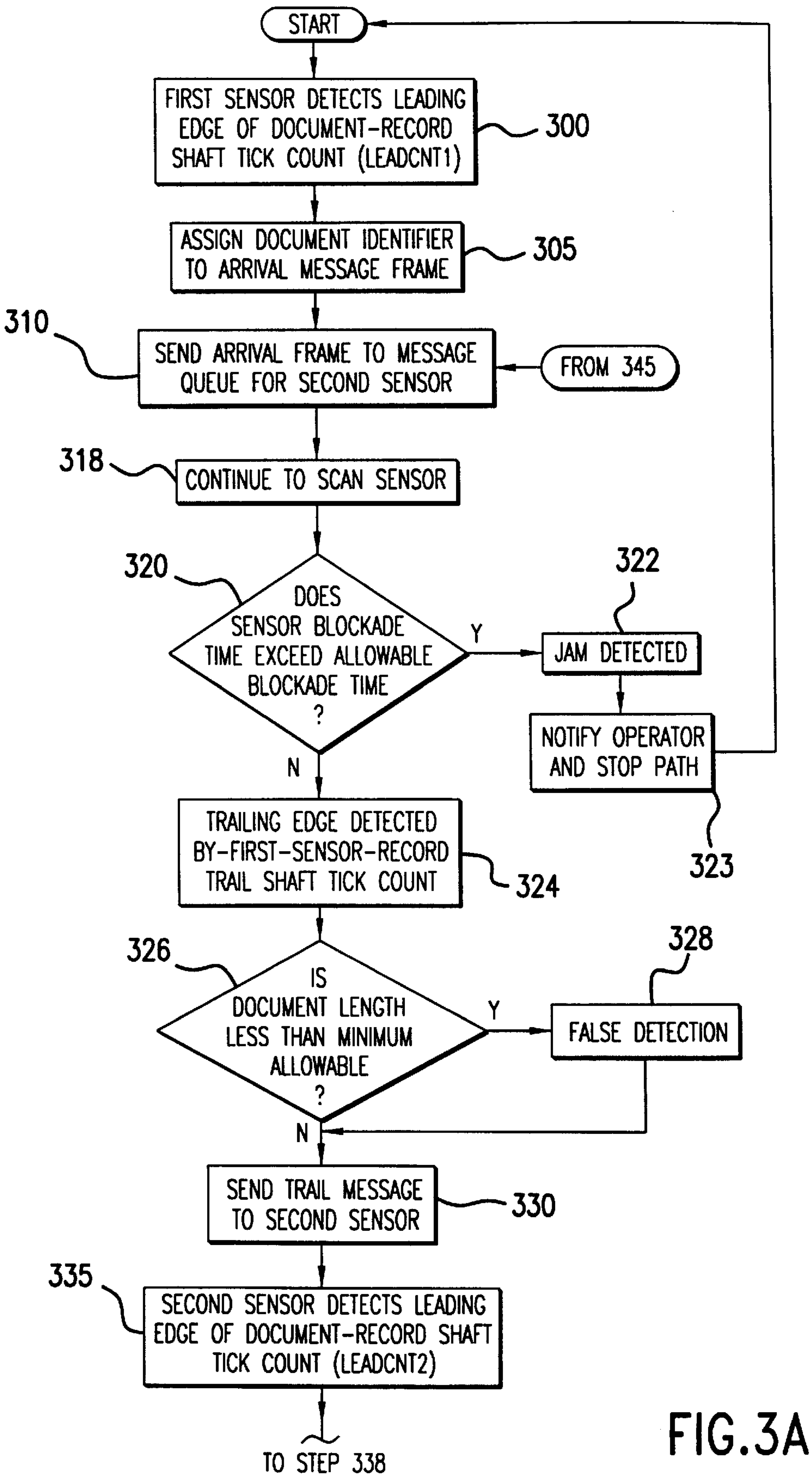
FIGS. 3A and 3B are flow charts generally illustrating the document surveillance process in accordance with the invention for each surveillance module.

FIGS. 3A, B, and C show a method in accordance with the invention, for using the plurality of optic sensors 146, with reference to the OCR station 116, to detect jamming errors, document separation errors, and document "disappearance errors," in real time. This unique surveillance method incorporates a document identifier and message queue technique integrated with the plurality of sensors to track documents through the OCR station. This method is used by each of the surveillance modules 116, 118, 120, 124 in the document surveillance system.

The first sensor 154 on the OCR station 116 detects the leading edge of a document and as illustrated at block 300 the secondary master OCR processor 200 records the current shaft tick count from the OCR station shaft encoder 144 which is a reference indication for the detected edge of the document. This information (LEADCNT1) becomes one component of a message frame 311 (see FIG. 3B). The document receives an identification number (DOCID) which uniquely identifies the document to the system as illustrated by block 305. This information is also a component of the message frame 311. An arrival message frame is a message frame containing the shaft tick count corresponding to the detection of the leading edge of a document (EDGECNT), such as LEADCNT1. The arrival message is then communicated to a message queue for the second sensor (next sensor along the transport path) as shown at block 310.

Figure 3B:
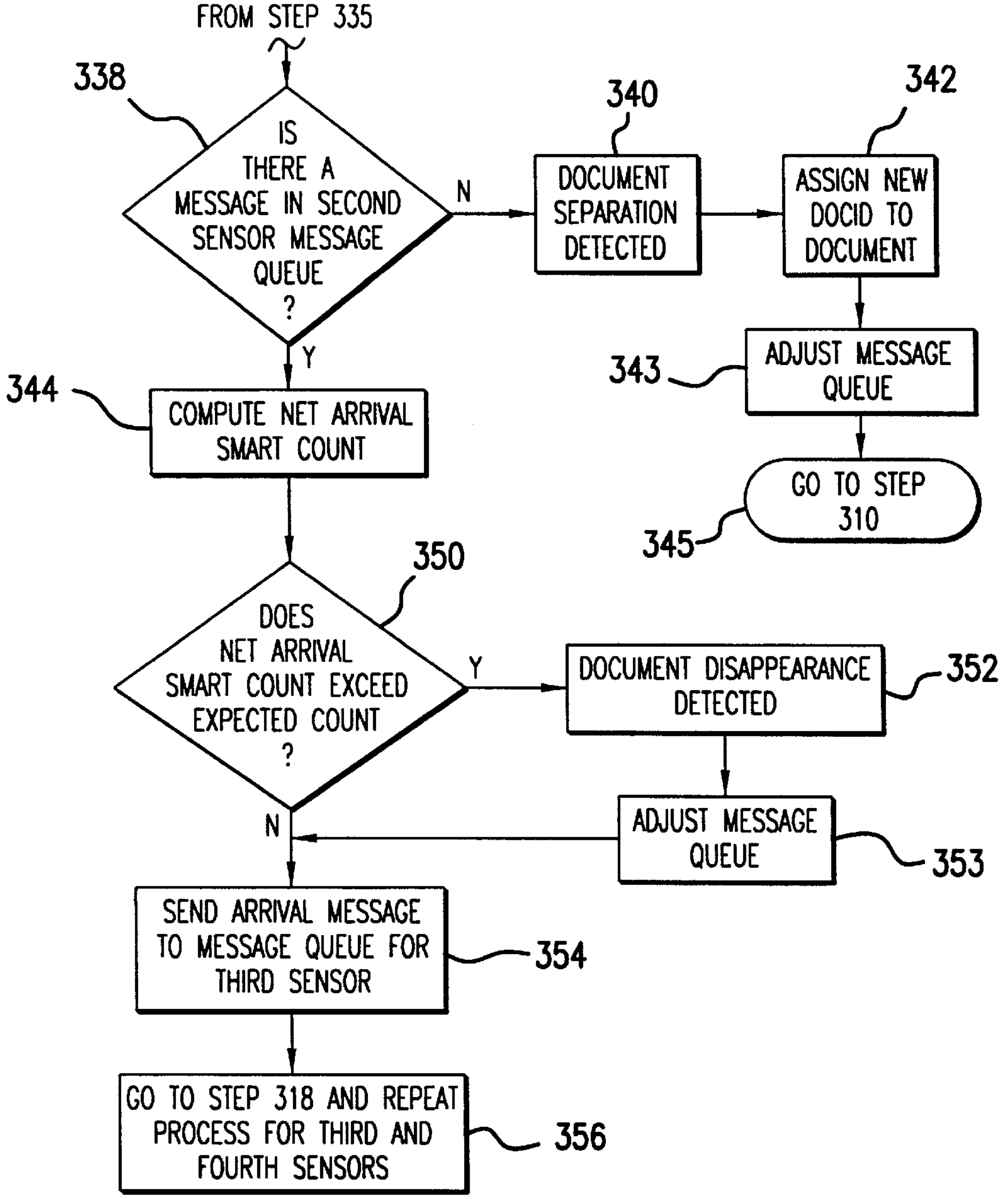
Figure 3C:
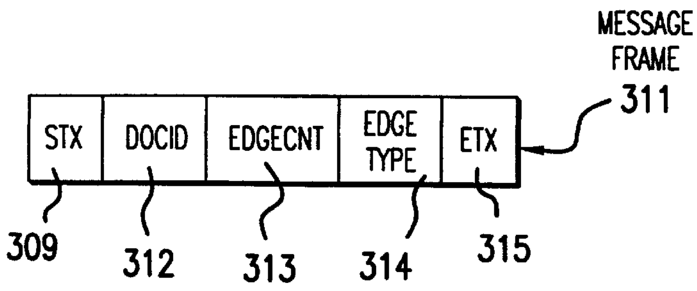
FIG. 3C is a diagram of the format of a message frame.

Reference to FIG. 3B, the arrival message frame 311 includes start text (STX) bits 309, document identification bits (DOCID) 312, edge shaft tick count EDGECNT 313, envelope edge type (leading edge versus trailing edge) 314, and end text (ETX) bits 315. This frame is stored in a message queue for the next sensor which is accessible by the OCR secondary master processor 200.

The sensor continues to be blocked by the document until the trailing edge passes the sensor. The OCR processor continues to scan the sensor 154 during this blockage interval, as illustrated by block 318, and a check 320 is performed to determine if the blockage time (in shaft encoder ticks) exceeds an allowable blockage time as set by the operator. If the sensor detects the same document for too long, a jam (i.e., object status) is detected as shown at step 322. The operator is notified and the transport path is stopped as illustrated in block 323. The path is cleared of the jam and the process continues at block 300.

When no jam is detected and the document proceeds down the transport path, the first sensor 154 detects the trailing edge of the document, and records the trailing edge shaft tick count in a trailing message frame step 324. The format of the arrival message frame and the trailing message frame generated at step 324 are identical. The content is different in that the trailing edge shaft tick count is used as the edge shaft tick count 313. At block 326, the leading edge shaft tick count is subtracted from the trailing edge shaft tick count to obtain the document length and the document length is compared to a stored minimum expected length. If the length is less than expected 326, a false detection is determined (step 328) indicating a possible malfunction of the sensor. Once the false detection is determined or if the document length is greater than the minimum length, the trailing message frame is sent to the message queue for the second sensor as illustrated by block 330.

As the document continues along the transport path the second OCR sensor 156 detects the leading edge of the document and records this leading edge shaft tick count (LEADCNT2) from the OCR shaft encoder 144 as indicated at block 335. The OCR secondary master processor 200 at step 338 (see FIG. 3B) checks if a message is available in the second sensor's message queue indicating that the document was detected by the first sensor. If no message exists, a document separation (i.e., object status) is detected, as shown at block 340, since the second sensor 156 detected a leading edge that was not detected by the first sensor 154. A DOCID is assigned to this separated document as illustrated by block 342 enabling the system to now track the document as though it entered the transport path properly and no flushing of the transport path is necessary. Proper tracking is facilitated by adjusting the message queue (rearranging messages in the message queue—to be discussed with reference to FIG. 4) as shown in block 343. Once the message queue for the second sensor is adjusted, the arrival message for the new document is sent to the message queue per the task of block 310 as indicated in block 345.

If a message exists at step 338, the OCR processor 200 retrieves the arrival frame from the message queue for the second sensor 156 and a net arrival shaft count is computed using LEADCNT1 and LEADCNT2 for the document as shown at block 344. The OCR processor 200 compares the computed net shaft tick count with an expected arrival shaft tick count at step 350. If it is determined that the net arrival shaft tick count exceeds the expected arrival count, a document disappearance (i.e., object status) is detected as illustrated at block 352. Once the processor detects the document disappearance, it removes from the queue the arrival message associated with the missing document as shown at block 353 so that the queue accurately reflects the messages associated with the next document on the transport path. The system is not shut down and the transport path is not flushed since the adjustment compensates for the missing document and the system continues to block 354. The expected shaft tick count is calculated based on the transport path speed, belt slippage tolerances and any other variables affecting the rate at which the document travels between sensors. Document arrival time is dependent upon the shaft tick count measured by the previous sensor.

If the net arrival shaft tick count is substantially equal to the expected arrival shaft tick count, no disappearance occurred. The recorded LEADCNT2 is sent via the arrival message frame to the message queue for the third sensor as illustrated by block 354. The process is then repeated starting as step 318 for the third and fourth sensors in the OCR station; the fourth sensor has its messages communicated to the message queue for the first sensor of the next surveillance module (here the secondary delay station 118). As with the first sensor at step 320, all sensors in the surveillance module are used to detect document jamming.

The second sensor also serves as a station activation sensor for the OCR station. The station activation sensor is the last sensor before the OCR reading window and provides information for the primary function of the station (i.e. the OCR function) that the document should arrive shortly. The OCR activates its set up procedures and prepares to read the approaching document. Each sensor in the OCR station is considered as a separate task handled by the OCR secondary master processor 200.

Figure 4A:
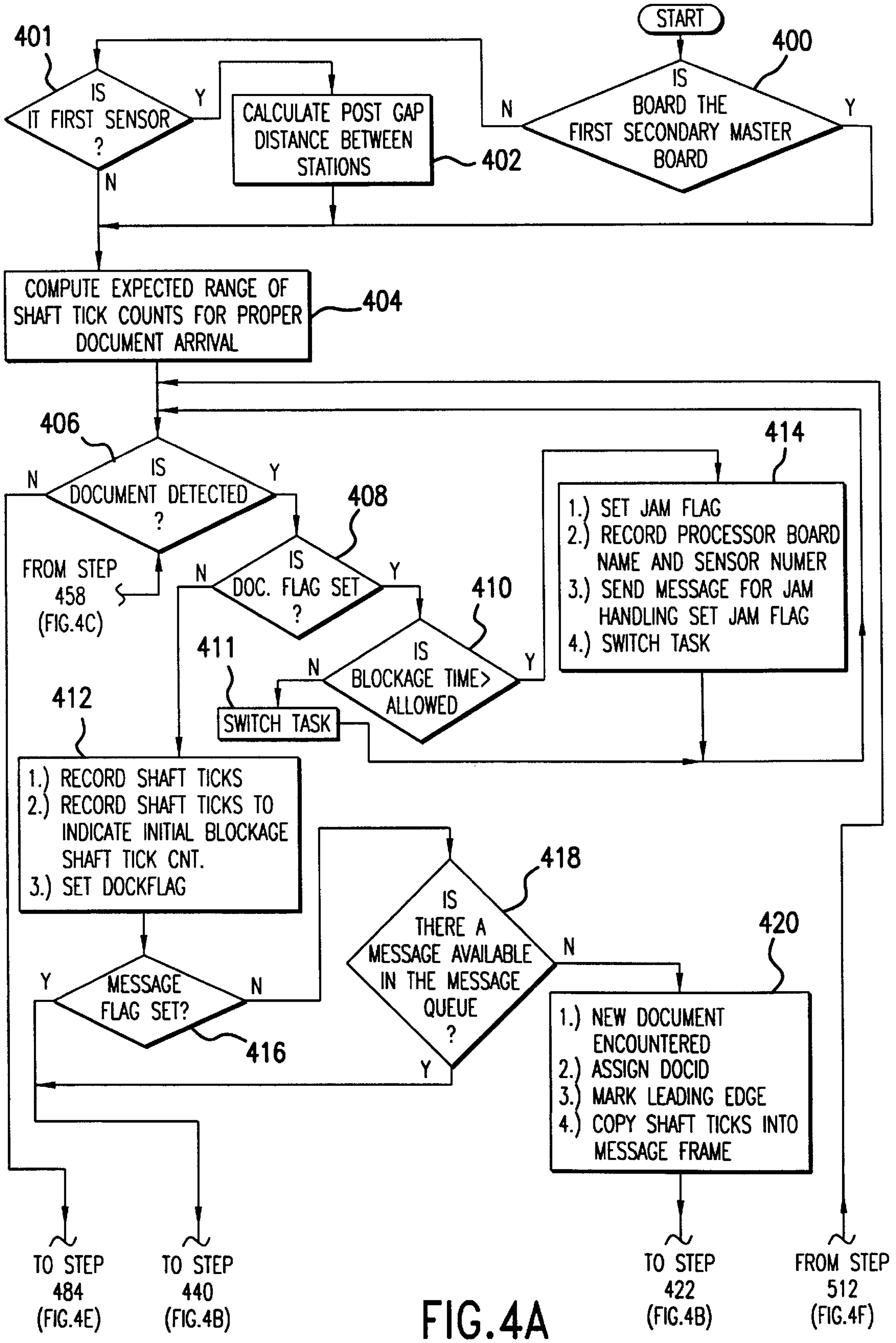
FIGS. 4A–4G show a more detailed flow chart depicting the document surveillance process of a sensor as generally illustrated in the process of FIGS. 3A and 3B.

FIGS. 4A–G illustrate the processing method employed by a station's secondary master processor for a single sensor of interest (pair of photocells) used in that processor's surveillance module. This process is, generally, the task performed for each sensor of each of the stations 200, 205, 210 and 215. As shown in FIG. 4A, after starting, the processor first determines whether it is assigned to the first station in the transport path (the Operator/OCR station) as illustrated by block 400. If it is not assigned to the first station, the processor, in step 401, determines whether the sensor of interest is the first sensor in the station. If it is the first sensor, the processor retrieves from a look up table, the path gap distance, represented in encoder shaft tick counts, between the previous station and the current station (step 402). The path gap distance is the distance between the last sensor from a previous module and the first sensor of the next module assuming that the transport path belts for each module are separate.

After the post gap distance is retrieved, the processor computes the expected range of shaft ticks that indicate proper arrival of the document from the previous sensor as illustrated by block 404. Similarly, if the processor is assigned to the first station, the processor then computes the expected range of shaft ticks that indicate proper arrival of the document from the previous sensor. These computations include determining: the exact number of shaft tick counts that are expected, the minimum number of allowable shaft tick counts, and the maximum number of allowable shaft tick counts. If the sensor is not the first sensor at block 401, the processor also computes the expected range of shaft ticks as illustrated by block 404.

Next, the processor checks to see if a document has been detected at step 406. When a document is detected, the document flag bit (DOCFLAG) is polled to determine whether it has already been set as illustrated by block 408. If DOCFLAG is set, indicating that the sensor is blocked, the processor computes at step 410 whether the blockage time (in shaft encoder tasks) of the document exceeds the allowable blockage time determined in step 404. If the blockage time is not greater than the allowable blockage time, the processor switches to a new task (i.e. the next sensor) at step 411 and begins the same process for the next sensor starting at step 406.

When the blockage time exceeds the allowable blockage time, a jam is detected as illustrated by block 414. Once a jam is detected, the processor board name and sensor number is recorded and sent to the data processing unit via the primary master processor 225. The processor sets the jam detection flag and switches to the next task (i.e. sensor).

If the DOCFLAG bit is not set (i.e. a leading edge has been detected), the processor reads the shaft encoder tick count and records this count in a look up table at step 412. At this time the same count (initial shaft tick count) is copied into another location for use in later calculating the net blockage time (step 412). To indicate that a document has just been detected, the DOCFLAG bit is also set as illustrated by block 412.

Once this information is recorded, the message flag (MSGFLAG) for the sensor is polled at step 416. If the MSGFLAG is set, thereby indicating that a separation has been detected (described later in the flow), a computation of the net arrival shaft ticks is made at step 440 of FIG. 4B. When the MSGFLAG bit is not set, the processor attempts to extract a message from the sensors message queue and determines if a message is available as illustrated by block 418. If there is a message available (arrival message from a prior task) a computation of the net arrival shaft ticks is made at step 440. When no message in the message queue is available, a new document has been encountered.

Once a new document is detected at block 418, the system assigns a unique document identifier (DOCID) at step 420. The DOCID is typically generated by incrementing the DOCID from the previous document that was detected, but any suitable identifier may be used such as the time at which the document was detected. The DOCID is assigned to each document by the first secondary master processor board 200 and stored in its memory. Subsequent access to the stored DOCID made by other secondary master processors is normally made to that same memory on the processor board 200. The DOCID serves to identify the document to each sensor and each surveillance module in the document surveillance system. The processor also marks the leading edge of the document by reading the shaft tick count of the shaft encoder recorded in the look-up table at step 412 and copying the shaft encoder tick count into the arrival message frame. This count represents the shaft tick count at the time the sensor detected the leading edge of the document.

Figure 4B:
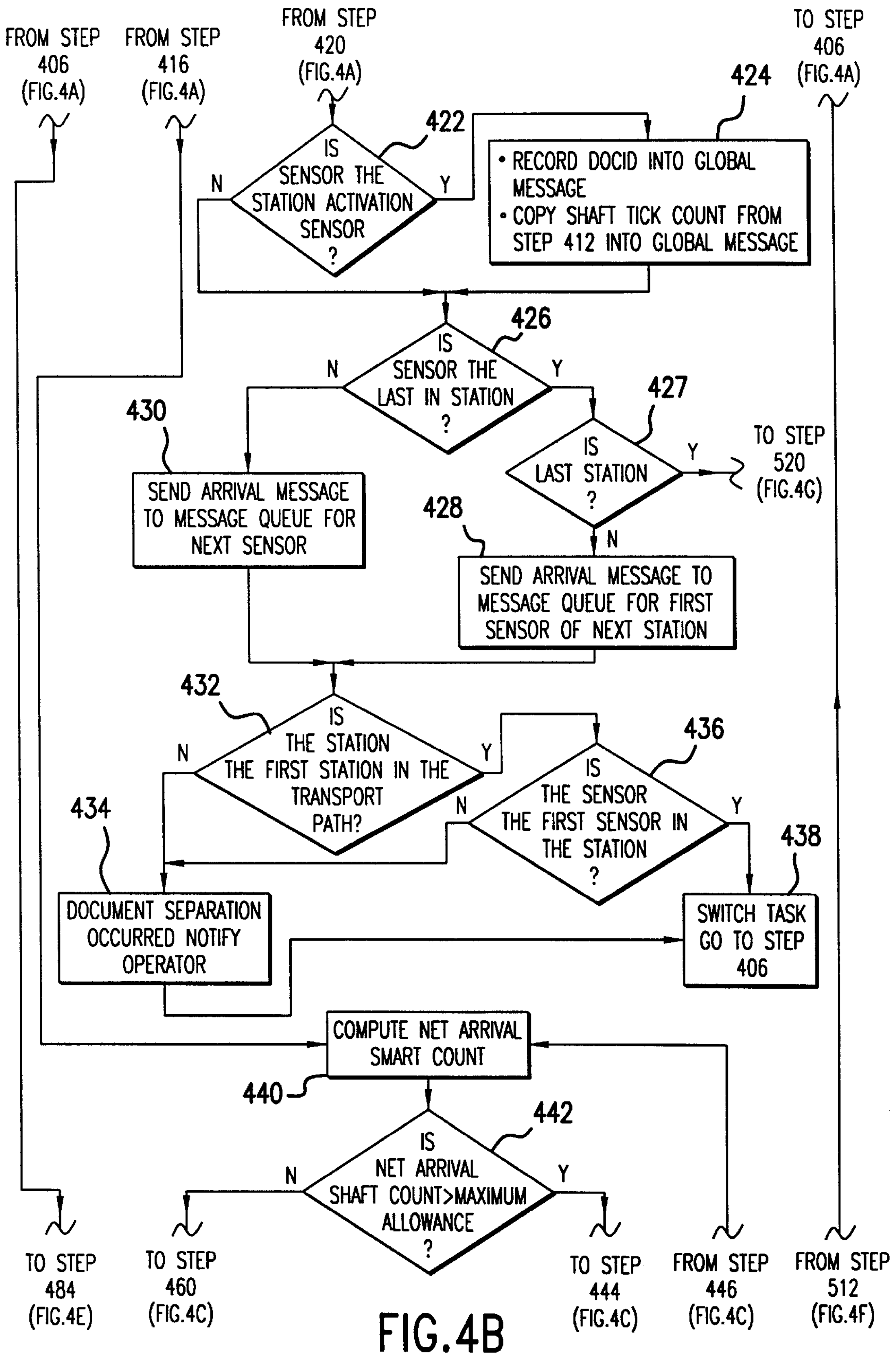
Figure 4C:
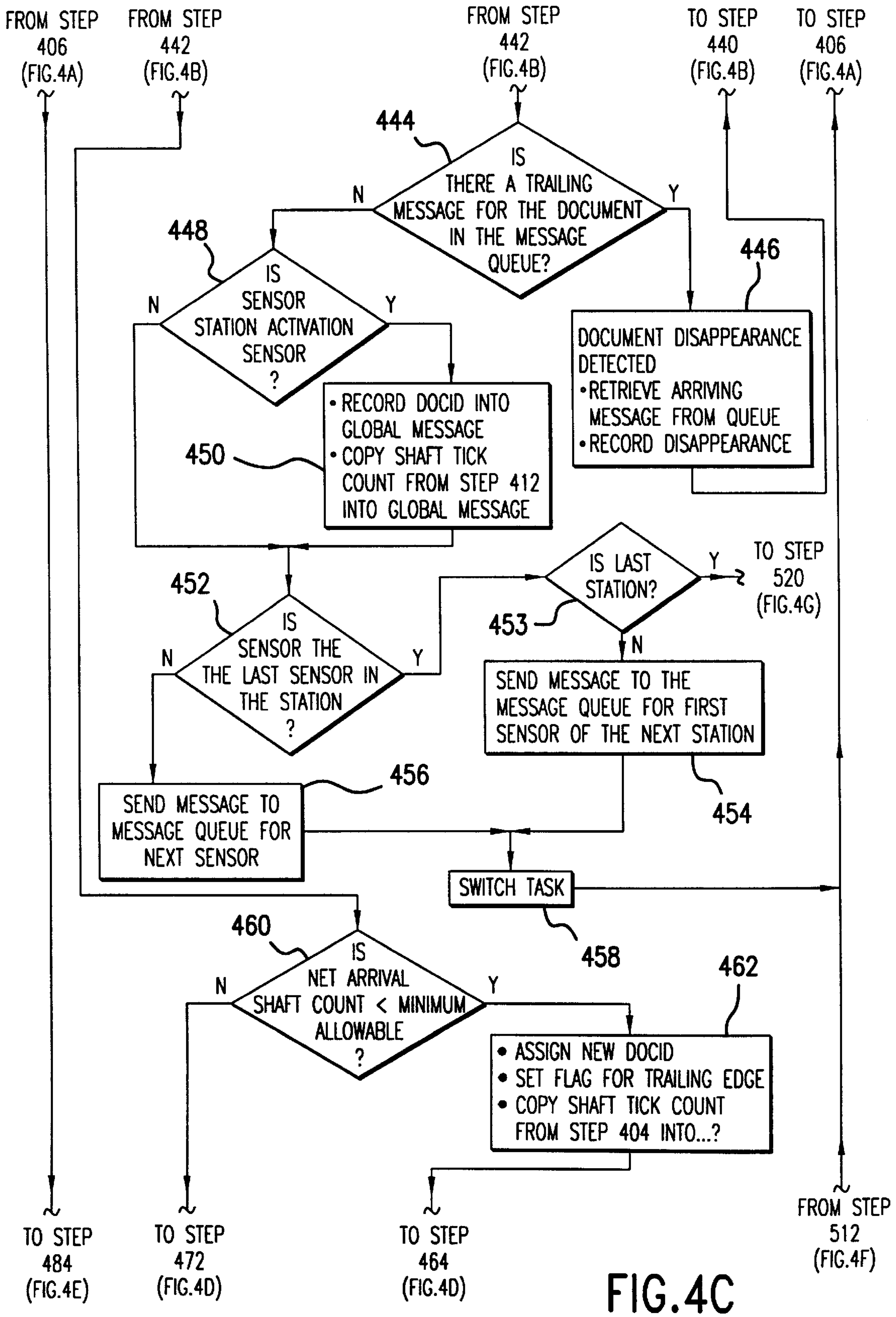

Referring now to FIG. 4B, the processor next determines whether the sensor of interest is the station activation sensor for that station as illustrated by block 422. If the sensor of interest is the station activation sensor, the processor records the DOCID from step 420 into a global message frame at step 424. The processor also copies into the global message frame the shaft tick count recorded in step 412 as illustrated by block 424. The global message frame is considered global because it is used by the functional device in the module and is not sent as a message frame to the message queue for the next sensor. For example, after the OCR station 116 creates the global message frame, the OCR uses this message to position its read window based upon the expected arrival time of that document. After the global message is generated, the processor then determines whether the sensor is the last sensor in the station at decision block 426. If the sensor of interest is not the station activation sensor 422 the processor directly proceeds to determine whether the sensor is the last sensor in the station at step 426.

When the sensor is the last sensor in the station and the station is not the last station at step 427, the processor sends the arrival message to the message queue for the first sensor of the next module as illustrated by block 428. The processor accesses the shaft tick count of the next module via the MULTIBUS. This count (LEADCNT) is communicated in the arrival message to the next module and serves as the initial shaft tick count used to determine the proper arrival time between modules. If the station is the last station, processing branches to step 520 of FIG. 4G. If the sensor is not the last sensor in the station, the processor in step 430 communicates the arrival message to the message queue for the next sensor. Once a document has been detected and the arrival message is communicated to the appropriate task, the processor determines whether the new document is one that has been separated from a previous document.

The processor control continues from step 428 or 430 to step 432 and determines whether the station is the first station in the transport path (i.e. OCR station) 432. If not, a new document was detected after the first station, and therefore a separation has occurred as indicated at block 434. The operator is notified but sorting continues uninterrupted since the document is still tracked and the arrival message (including the document's identifier) is communicated to the next sensor 430 and the global message corresponding to the separated document was generated at step 424. The processor then continues on to the next task by branching to block 406 as illustrated by block 438.

A separation is also detected and corrected when the document separates after the first sensor on the current station. If the processor determines that the sensor of interest is not the first sensor in the first station at step 436, a document separation is detected as illustrated by block 434. However, if the sensor is the first sensor in the first station to step 436, no separation is detected and the processor switches tasks to the next sensor at step 438.

Referring to the conditions of steps 416 and 418 of FIG. 4A after the processor determines that the message flag is set or that a message is available in the sensor's message queue, the processor next computes the net arrival shaft count at step 440. The processor then checks, at step 442, to determine whether the computed net arrival shaft count exceeds the maximum shaft tick count expected (determined in step 404 of FIG. 4A). If the net arrival shaft count does not exceed the maximum count expected, the processor then determines whether the net arrival count is less than the minimum shaft tick count expected (determined in step 404) as illustrated by block 460. However, when the net arrival shaft count does exceed the maximum count expected a test is performed (See FIG. 4C) to determine if a document disappearance occurred.

In the first step 444 of the test, the processor determines whether there is a trailing message in the message queue. If there was a trailing message for the document, a document disappearance is detected as illustrated by block 446. This results because the documents's leading and trailing edge was detected by the previous sensor yet the next sensor had not detected the document with in the expected time. Once the processor detects the document disappearance, the arrival message for that document is retrieved from the message queue to avoid mistaken identity with the next document traveling along the transport path and the disappearance is recorded as part of the real time error detection at step 446. After the document disappearance is recorded, the net arrival shaft count is computed at step 440 for the next document detected by the sensor of interest.

When no trailing message exists in the message queue at step 444, the processor determines whether the sensor is the station activation sensor at step 448. If the sensor is the station activation sensor, the global message is generated as illustrated by block 450 (as in step 424), wherein the processor records DOCID into the global message and also copies the shaft tick count from step 412 into the global message. Once the information is recorded for the global message, the processor determines whether the sensor is the last sensor in the station at step 452. However, if the sensor is not the station activation sensor, the processor does not record any information for the global message but directly determines whether the sensor is the last sensor in the station at step 452.

If the sensor is the last sensor in the station at step 452 and the station is not the last station at step 453, the processor sends a message to the message queue for the first sensor of the next station in step 454 (as in steps 426–428). When the sensor is not the last sensor in the station, the processor transfers the message to the message queue for the next task (sensor) in the station in step 456. Once the processor has sent the message to the appropriate message queue, the processor switches tasks as illustrated by block 458 and continues the process from step 406 of FIG. 4A for the next sensor in the module (station).

Referring to step 442, once the processor has determined that the net arrival shaft count is less than the maximum expected arrival shaft count, the processor determines whether the net arrival shaft count is less than the minimum expected shaft count (determined in step 404) at step 460. When the net arrival shaft count is not less than the minimum allowable shaft count, the document has reached the next sensor within the acceptable time interval and the processor then determines whether the sensor of interest is the station activation sensor as illustrated by block 472 of FIG. 4D.

However, if the net arrival shaft count is less than the minimum allowable shaft count, this indicates that a document separation occurred. Consequently, the processor assigns a new DOCID and copies the shaft tick count recorded in step 412 and the new DOCID into a new message at step 462. After the DOCID is assigned and the arrival shaft count has been generated, the processor determines whether the sensor is the last sensor in the station as illustrated by decision block 464.

As in steps 452–456, if the sensor of interest is the last sensor in the station and the station is not the last station at step 465, the processor sends a message to the message queue for the first sensor of the next station in step 466. When the sensor is not the last sensor in the station, the processor transfers the message to the message queue for the next task in the station in step 468. Once the processor has sent the message to the appropriate message queue, the processor informs the primary master processor that a document separation occurred as illustrated by block 470. The message flag is set indicating a document separation and the processor continues the process for the next sensor branching back to step 406.

Figure 4D:
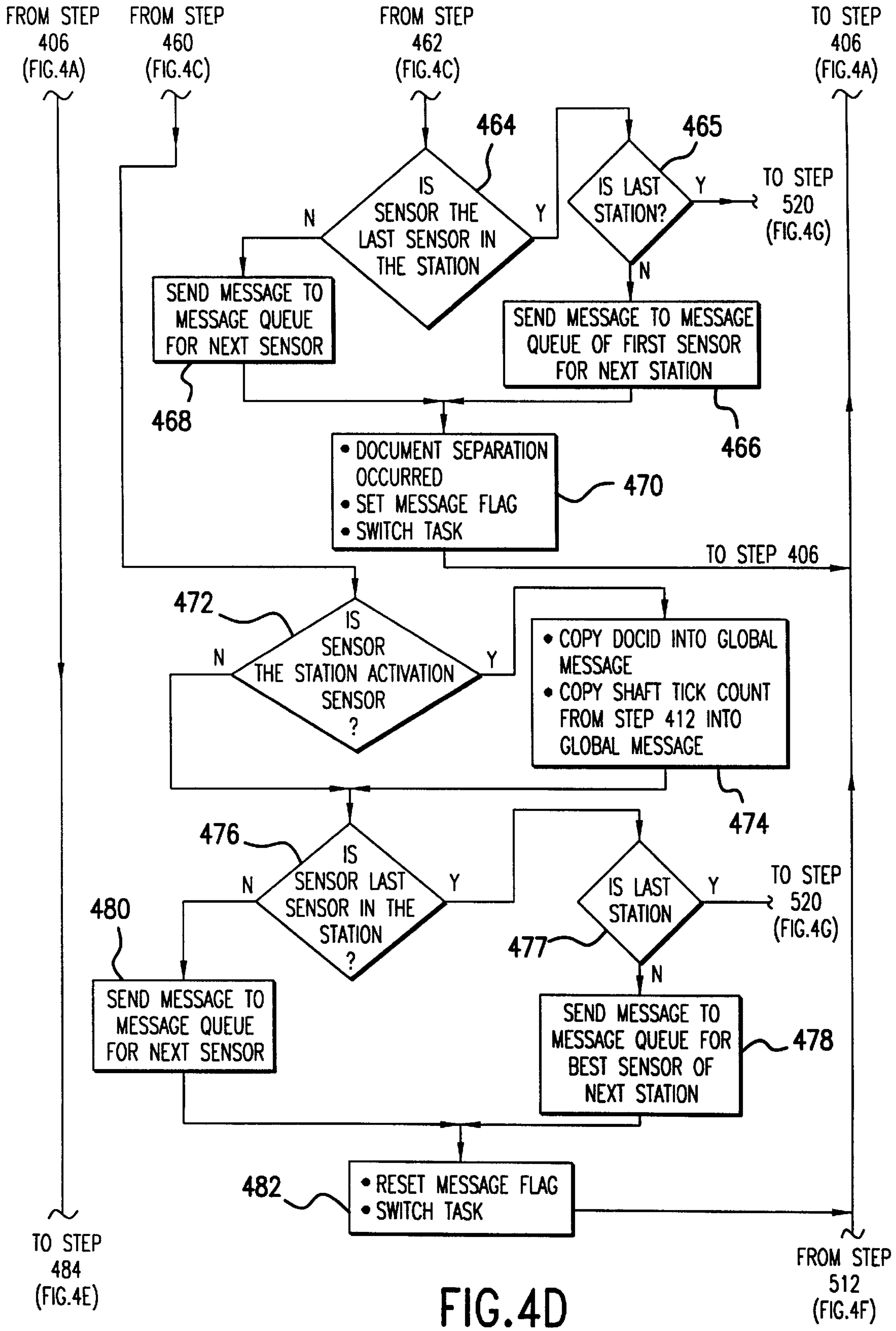

As stated previously with respect to step 460, when the net arrival shaft count is within the acceptable range, the processor determines whether the sensor is the station activation sensor in step 472 of FIG. 4D. If the sensor is the station activation sensor, the contents of the global message are generated, as in previous step 450, which includes copying DOCID and the arrival shaft tick count (from step 412) into the global message as illustrated by block 474. After the global message is constructed, the processor determines whether the sensor is the last sensor in the station at step 476. However, if the sensor is not the station activation sensor at step 472, the processor proceeds directly to step 476 to determine whether the sensor is the last sensor in the station (as in steps 464–468). When the sensor of interest is the last sensor in the station and the station is not the last station at step 477, the processor sends a message to the message queue for the first sensor of the next station in step 478. If the station is the last station at step 477, processing branches to step 520 of FIG. 4G. When the sensor is not the last sensor in the station, the arrival message is sent to the message queue for the next task in step 480. After the message has been communicated to the appropriate message queue, the message flag is reset and the processor continues to the next task by branching to block 406 as illustrated by block 482.

Some steps in the leading edge document process, as described in steps 406–482, are completed in conjunction with the trailing edge process as described hereafter. The spacing of the sensors varies from module to module, but typically the spacing between sensors is less than the length of the documents such that the leading edge of a document typically passes a first sensor while the next sensor detects that same document's leading edge before the trailing edge is detected by the first sensor. The inventive surveillance process is not dependent upon the sensor spacing as the multi-tasking process provides real time document surveillance.

Figure 4E:
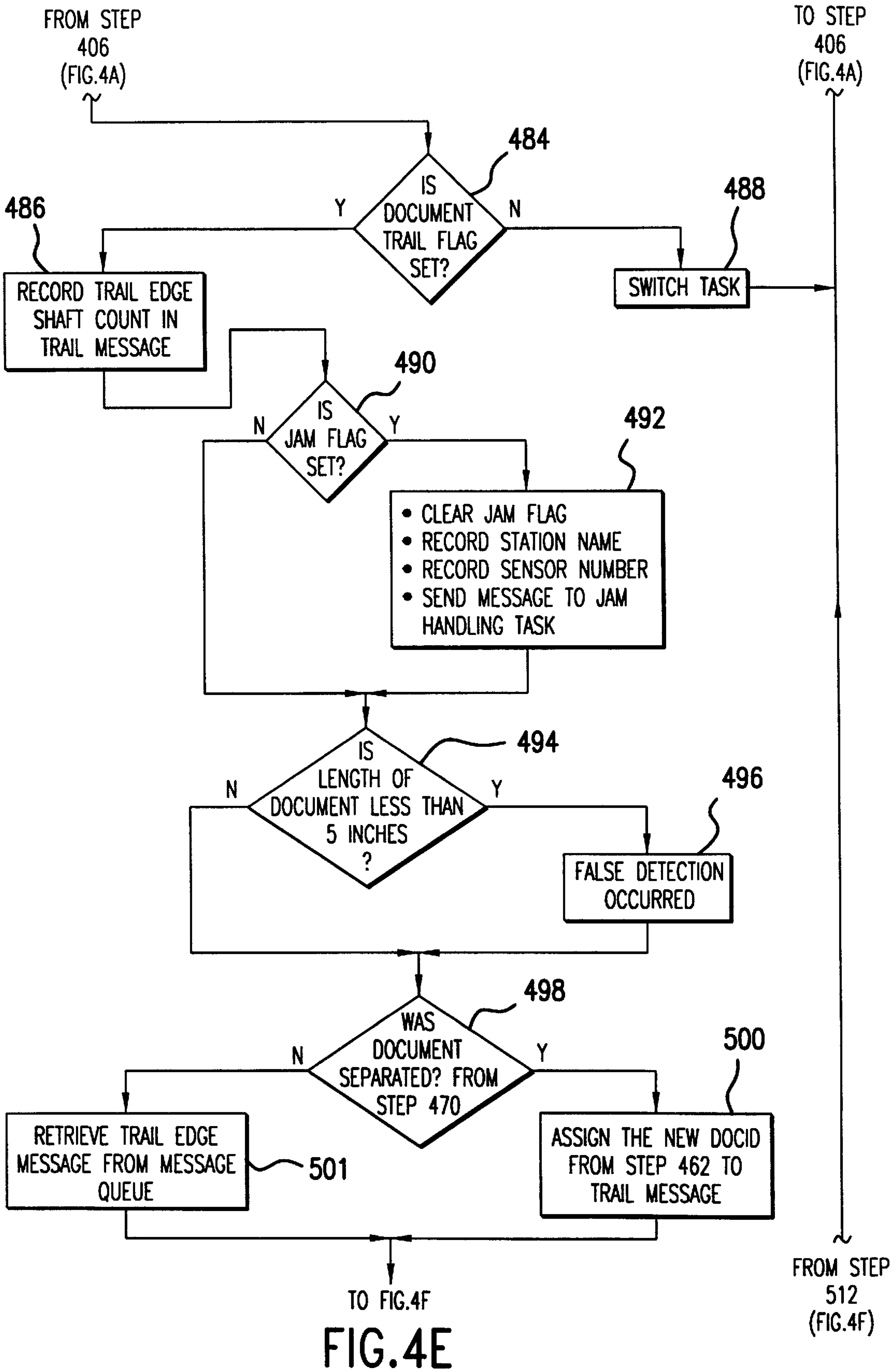

The trailing edge process is described generally in steps 484–498 of FIG. 4E. If the processor determines that the sensor has not detected a document at step 406 of FIG. 4A, the processor checks to see whether the document detection flag is set as illustrated by block 484. If it is set, this indicates that the sensor has previously detected the documents but since the sensor is no longer detecting a document (as determined at step 406), the trailing edge has passed the sensor. The processor then reads the shaft tick count from the shaft encoder and records this count in a trailing edge look up table in step 486. If, the document flag is not yet set, the processor switches to its next task as indicated by block 488 because a leading edge has not yet been detected by the sensor. Once the trailing shaft tick count is recorded at step 486, the processor determines whether the jam flag has been set from step 414 as illustrated by block 490. If the jam flag is set, the processor determines that the trailing edge of the jammed document has passed the sensor and the jam flag is cleared as illustrated by block 492. In addition to clearing the jam flag, the processor records the station name and the sensor number and sends this information in a message to the primary master processor in step 492. Jams are detected by leading edge information. Document length measurements result from both leading edge and trailing edge information.

After the message is sent to the primary master processor, the processor determines the length of the document at step 494 by subtracting the shaft tick count in the arrival message from the shaft tick count in the trailing message. The processor determines whether the document length is less than the minimum allowable document length set by the operator. If the jam flag is not set, the processor determines whether the length of the document is less than five inches. This length may be any suitable length as determined by the operator.

When the document length is less than five inches, a false document detection has occurred as indicated by block 496. This may occur if the sensor fails and intermittently or permanently indicates an output corresponding to a document detection when in fact no document passed the sensor. The processor assumes that no false detection occurred and determines whether the document is a separated document at step 498 (as determined in steps 460–470). This assumption allows the processor to keep the message queue for the next sensor stacked with the proper pair of arrival messages and trailing messages. If the document length is not less than five inches the processor still verifies whether the document was separated at step 498.

When the processor determines that the document was separated at step 498, the processor copies the new DOCID assigned in step 462 to the trailing message as illustrated by block 500. The processor then determines whether the sensor of interest is the station activation sensor at step 502 of FIG. 4F. If a document separation was not detected at step 498, the processor retrieves the trail message from the message queue 501. The processor then determines whether the sensor is the station activation sensor at step 502 of FIG. 4F.

Figure 4F:
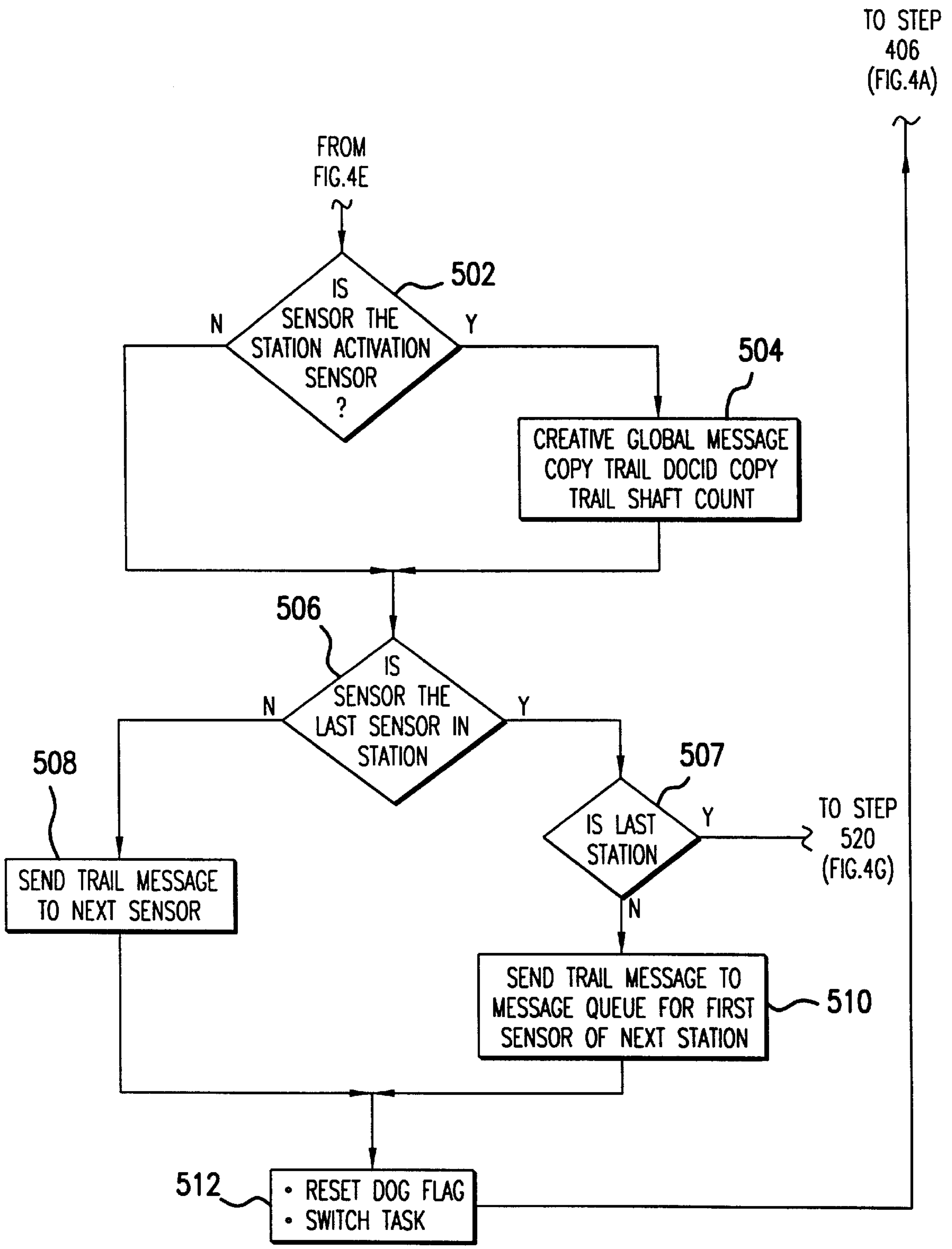

Referring to FIG. 4F, if the sensor is the station activation sensor at step 502, the global trail message is generated at step 504. Both the DOCID and the trail edge shaft tick count are copied into the global message at step 504, for use by the activity function (i.e. OCR or BCR) associated with the station. The processor then determines whether the sensor is the last sensor in the station as illustrated by block 506. However, if the sensor is not the station activation sensor, the processor proceeds directly to step 506 and determines whether the sensor is the last sensor in the station.

When the sensor is not the last sensor in the station, the processor sends the trail message to the message queue for the next sensor in the station as illustrated by block 508. When the sensor is the last sensor in the station and the station is not the last station at step 507, the processor sends the trailing message to the message queue for the first sensor of the next station via the common multi-bus between the current secondary master processor and the next station's secondary master processor as illustrated by block 510. Once the trailing message is communicated to the proper message queue, the processor resets the DOCFLAG and switches to its next task as illustrated by block 512 by returning to step 406.

Figure 4G:
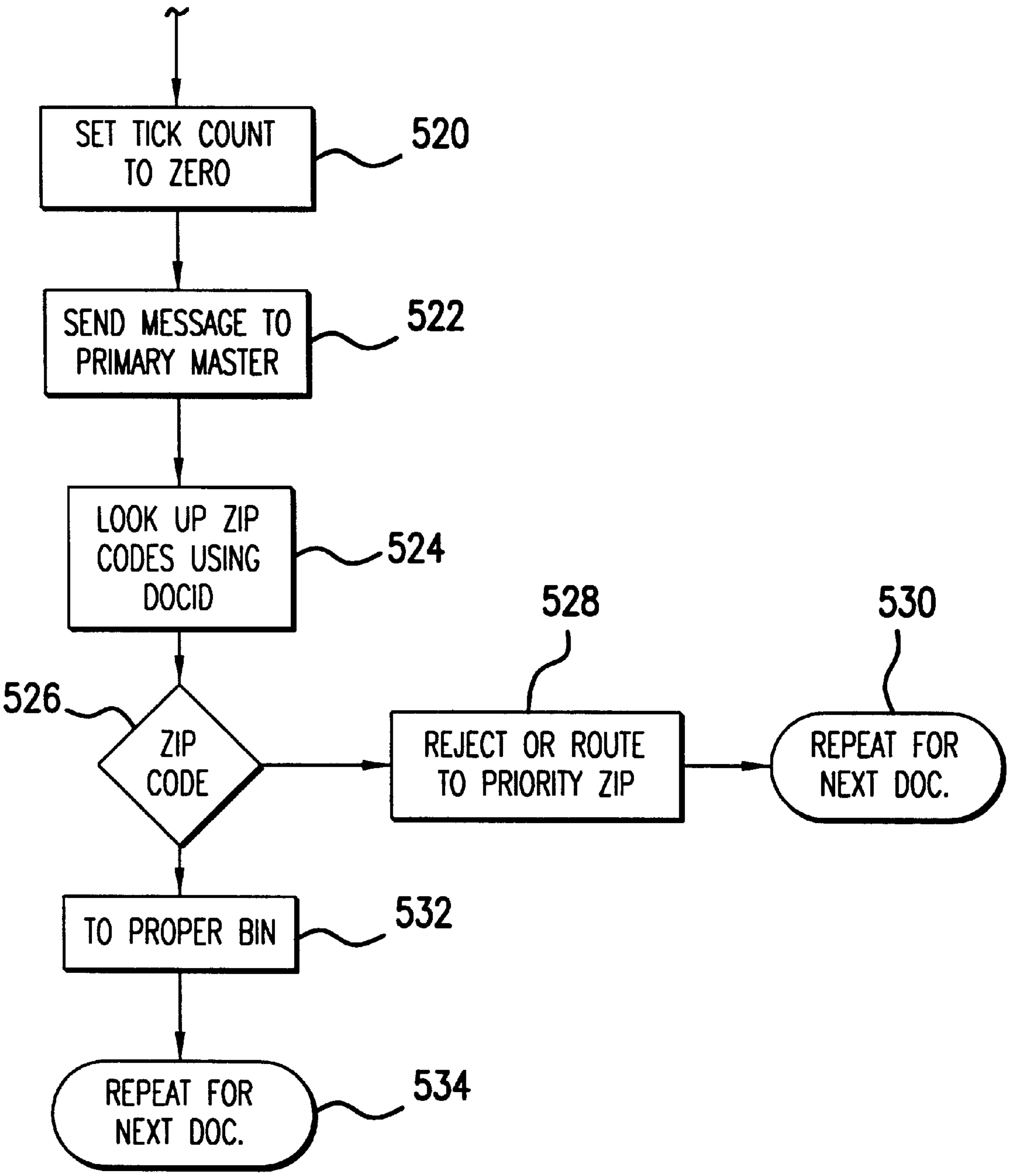

In the event that the sensor is the last sensor in the last station (module) at steps 427, 453, 465, 477 or 507, the processing control branches to step 520 of FIG. 4G where the shaft encoder tick count is set to zero in the message frame. The message frame is then sent to the primary master processor board 225 as illustrated at block 522, and the DOCID from that message, which identifies the document, is used to look up the zip code for that document (step 524). During the processing of the document in the illustrated embodiment, the address on the document is read by the OCR and the zip code is obtained (e.g., by reading it off the document or by obtaining the zip code based upon the address via the computer 134 from an address/zip code data base) and put into a table in the primary master processor memory with its associated DOCID. In addition, at the BCR station, the zip code is read again after having been written in bar code onto the document by the Ink Jet printer and is put into another table with the associated DOCID. When the master processor receives the message with the DOCID from the last station, both zip code tables are accessed using the DOCID and the two zip codes are compared as illustrated by block 526, to determine if they are the same. If they are the same, the document is routed to the proper bin for that zip code at step 532. If they are not the same, the document is rejected, or alternatively may be routed to the bin of the zip code of a preselected one of the two zip code tables at step 528. For example, if the OCR table is designated as the priority table, then the document would be routed to the zip code of the OCR zip code table if the zip codes don't match. The process is then repeated for the next document as illustrated by blocks 530 and 534.

From the foregoing description, it is apparent that each sensor is used as a jam detection and document separation detector. The system continues to operate and track separated documents and does not flush the transport path when a separation occurs. In addition, the adjustment of the message queue provides for proper identification of the document as it travels along the transport path according to jam and separation events.

Figure 5A:
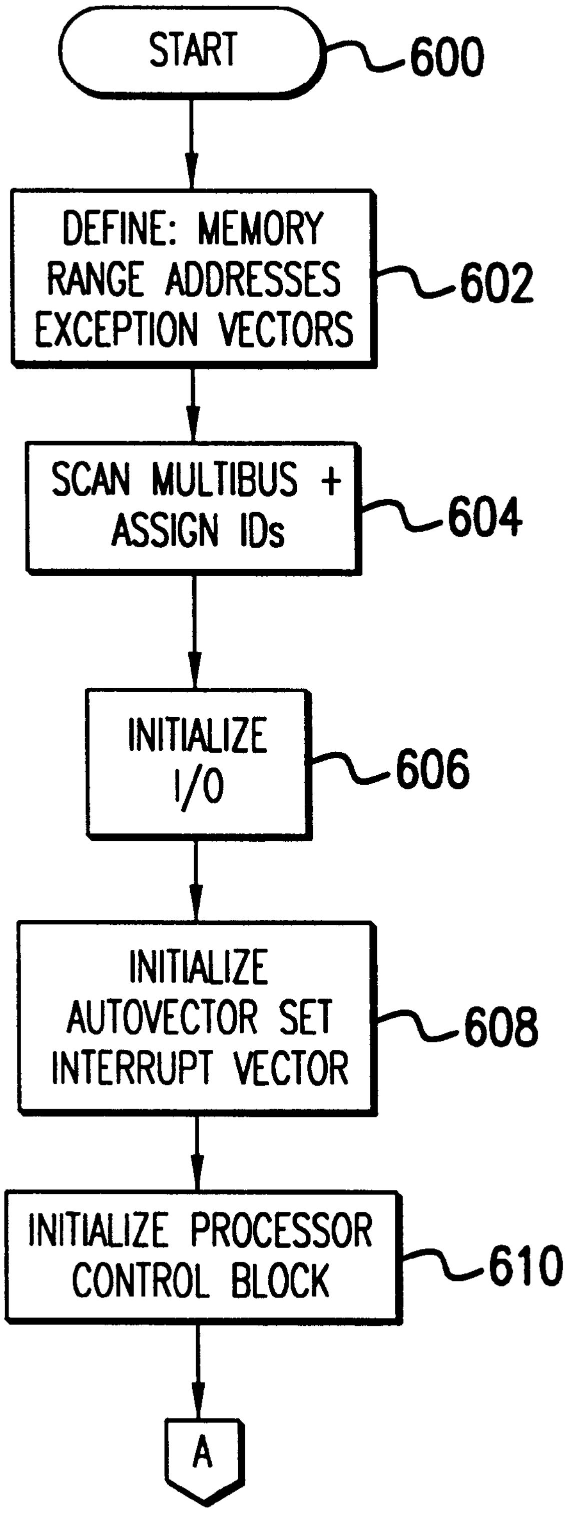
FIGS. 5A and 5B are detailed flow charts illustrating the methodology and logical flow of a specific embodiment of a multi-tasking operating system in accordance with the invention.
Figure 5B:
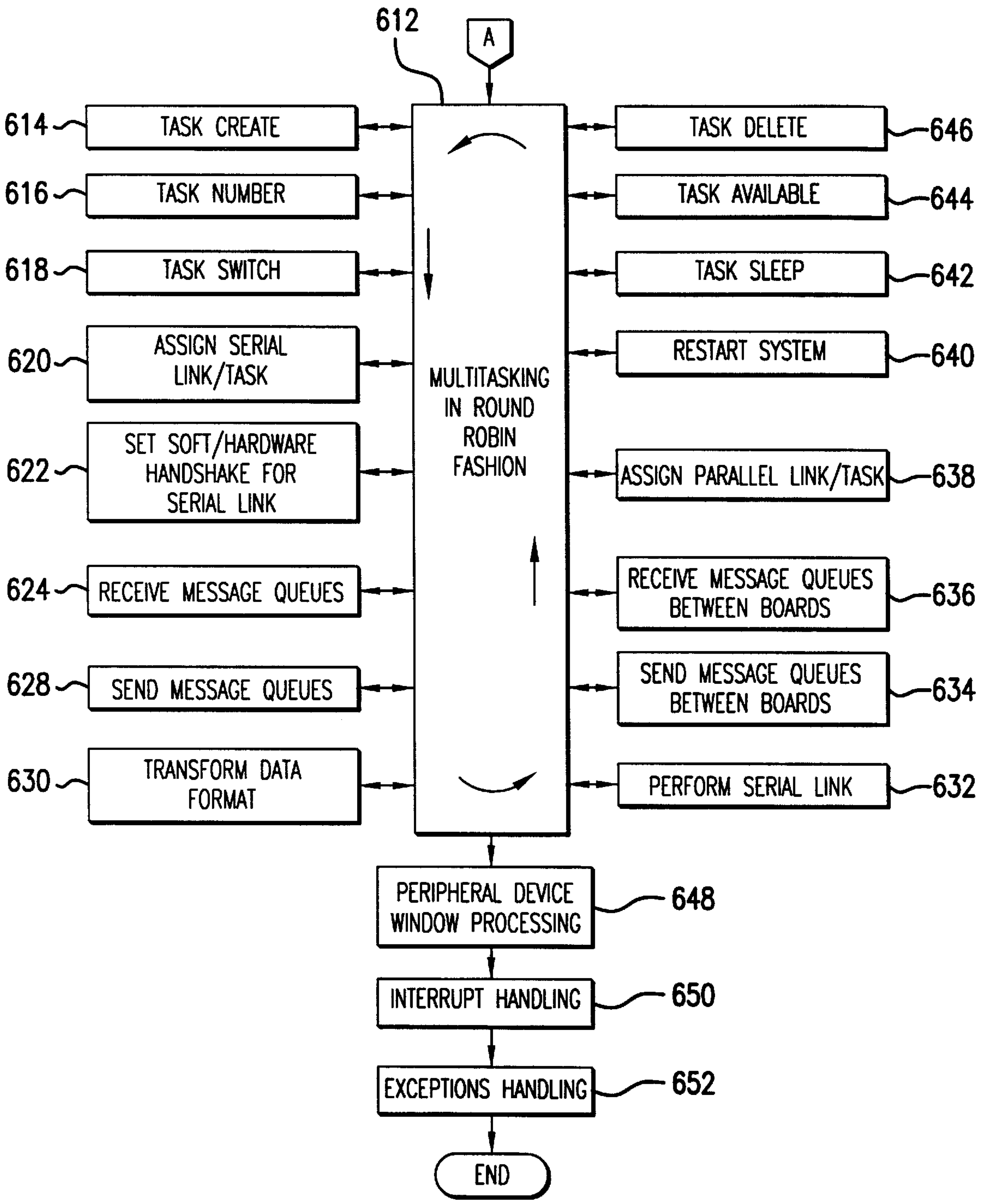

In the illustrated embodiment, the process of FIGS. 3A, 3B and 4A–F is run as a task for each sensor. Thus, each secondary master processor, as well as the primary master processor, is operating in a multi-tasking mode with multiple tasks running simultaneously under a multi-tasking operating system. The multi-tasking operating system creates and deletes tasks, as well as input and output for the tasks, and transmits, receives and stores the data. This multi-tasking operating system permits faster tracking of documents and faster processing of data. FIGS. 5A and 5B show a detailed flow chart illustrating the methodology and logical flow of a specific embodiment of a multi-tasking operating system to be loaded and run on the primary master processor 225 and each of the secondary multi-processors in accordance with the invention. An implementation of the operating system kernel (in 6K of memory) is shown in hexadecimal format in Appendix II.

Referring to FIG. 5A, the operating system is started at block 600, as shown, and blocks 602–610 illustrate various initializing functions. Hardware-related definitions are made, as illustrated by block 602, including definition of memory range and availability, definition of addresses related to serial and parallel parts and definition of exception vectors. The existing hardware in the Multibus cage is then scanned and an ID assigned to each processor (step 604) followed by initialization of the Input/Output (I/O) devices including the I/O serial controllers, the I/O parallel controllers and the I/O timer controllers as illustrated by block 606. An autovector table is then initialized and interrupt vectors set in step 608 after which the processor control block is initialized assigning I/O capability per task and assigning message queues and key ID capability per task in step 610.

Once initialization is complete, the processing of multiple tasks proceeds as illustrated by block 612 of FIG. 5B. Multi-tasking performed with Round-Robin process as shown in a counterclockwise order in FIG. 5B. Task creation, task number assignment, task switching and assignment of a serial link to a task are performed as shown by blocks 614, 616, 618 and 620, respectively, and the software and hardware handshaking for serial links is set in step 622. Receiving message queues between tasks (Step 624) and sending of message queues between tasks (Step 628) may then be performed after which transformation of parallel received data to the required format is performed as illustrated by block 630. Next, the serial link to the host computer (e.g., IBM PC) may be performed as illustrated by block 632, and the sending and receiving of message queues between processor boards may be performed as indicated by blocks 634 and 636. A parallel link to a task may be assigned as illustrated by block 638, and all existing tasks may be terminated and the system restarted, as indicated by block 640. A task may also be suspended (put to "sleep"), made available or deleted, as illustrated by blocks 642, 644 and 646.

The operating system may also read and process window information for peripheral devices such as the optical character reader, the bar code reader and the Ink Jet printer, as illustrated by block 648. Subsequently, interrupts may be served directly by the operating system for all interrupts, including the shaft encoder interrupt, serial receive/transmit interrupt, parallel receive transmit interrupts, bus interrupt and time clock interrupt. Subsequently, processor exceptions processing occurs at step 652.

The operating system is user switchable for tasks to permit a task to initiate the switch to another task. In addition, interrupt handling is incorporated into the operating system to increase task switching speed (e.g., as illustrated embodiment, task to task switching can be performed in 27 microseconds) so that when an event causes an interrupt, the interrupt handling routine at step 650 functions without the processing overhead needed to call or separate interrupt handling routines. Thus, the interrupt drivers are incorporated as part of the operating system kernel instead of separate interrupt handling routines as in the prior art. As a result, a shaft encode pulse interrupt can be handled every 200 microseconds in the illustrated embodiment. The operating system also increases speed by eliminating other overhead intensive functions such as memory management and DMA control.

Appendix I is a hexadecimal object code listing of an optical sensor task program (see FIGS. 3A–C and 4A–F) for practice of the invention in the illustrated embodiment wherein the secondary master processor boards are Model M68K10-5 processor boards each using a Motorola 68000 processor. Appendix II is a hexadecimal object code listing of the multi-tasking operating system (see FIGS. 5A–B) for practice of the invention in the illustrated embodiment using the Model M680K10-5 processor boards. These listings contain material which is subject to copyright protection. The copyright owner has no objection to the facsimile reproduction by anyone of the patent document or the patent disclosure as it appears in the Patent and Trademark office patent file, but otherwise reserves all copyright rights whatsoever.

Although the illustrated embodiment is directed toward document surveillance, the invention is equally suited for surveillance of any object having a beginning and ending point such as packages, fruits etc.

Specific embodiments of novel methods and apparatus for automated surveillance and sorting of objects has been described for the purposes of illustrating the manner in which the invention may be used and made. It should be understood that the implementation of other variations and modifications of the invention in its various aspects will be apparent to those skilled in art, and that the invention is not limited by the specific embodiments described. It is therefore contemplated to cover by the present invention any and all modifications, variations, or equivalents that fall within true spirit and scope of the basic underlying principles disclosed and claimed herein.

What is claimed is:

1. A document surveillance system for tracking a document traveling along a transport path in a document sorting system comprising:

a plurality of sensors, positioned in sequence along the transport path, for detecting an edge of the document;

indicia reading mechanism, positioned along the transport path, for reading indicia located on the document;

means, operably coupled to the plurality of sensors, for determining document status of the document as it travels along the transport path wherein the means for determining document status further comprises means for passing edge detection information between the plurality of sensors, said edge detection information comprising a unique document identifier and a representation of a position of a transport mechanism associated with said transport path.

2. The document surveillance system of claim 1 wherein said indicia reading mechanism is an optical character reader.

* * * * *